US012566155B2

(12) United States Patent
Halstead et al.

(10) Patent No.: US 12,566,155 B2
(45) Date of Patent: Mar. 3, 2026

(54) METHOD AND APPARATUS FOR DETECTING DEFECTS OR DETERIORATION IN THE SIDEWALLS OF CAN BODIES

(71) Applicant: Crown Packaging Technology, Inc., Tinley Park, IL (US)

(72) Inventors: Michael Halstead, Shipley (GB); Damien Andrew Bailey, Shipley (GB); Daniel Egerton, Shipley (GB)

(73) Assignee: Crown Packaging Technology, Inc., Tinley Park, IL (US)

( * ) Notice: Subject to any disclaimer, the term of this patent is extended or adjusted under 35 U.S.C. 154(b) by 164 days.

(21) Appl. No.: 17/922,722

(22) PCT Filed: Apr. 20, 2021

(86) PCT No.: PCT/EP2021/060197
§ 371 (c)(1),
(2) Date: Nov. 1, 2022

(87) PCT Pub. No.: WO2021/219431
PCT Pub. Date: Nov. 4, 2021

(65) Prior Publication Data
US 2023/0333058 A1 Oct. 19, 2023

(30) Foreign Application Priority Data

May 1, 2020 (GB) ...................................... 2006453

(51) Int. Cl.
*G01N 27/90* (2021.01)
*B21D 22/28* (2006.01)
(Continued)

(52) U.S. Cl.
CPC ......... *G01N 27/9006* (2013.01); *B21D 22/28* (2013.01); *B21D 51/26* (2013.01);
(Continued)

(58) Field of Classification Search
CPC .......... B21D 22/28; B21D 51/26; G01B 7/06; G01B 7/042; G01B 7/102; G01B 7/107;
(Continued)

(56) References Cited

U.S. PATENT DOCUMENTS 3,886,781 A * 6/1975 Paramonoff ........... B21D 45/06
72/344
4,782,678 A 11/1988 Reimschissel
(Continued)

FOREIGN PATENT DOCUMENTS

CN 109475917 A 3/2019
CN 110035840 A 7/2019
(Continued)

*Primary Examiner* — Eman A Alkafawi
*Assistant Examiner* — Courtney G Mcdonnough
(74) *Attorney, Agent, or Firm* — Condo Roccia Koptiw LLP

(57) ABSTRACT

A method of detecting defects or deterioration in the sidewalls of can bodies during production of the can bodies within a can bodymaker. Each can body is formed by pushing a cup, mounted on a punch of a reciprocating ram, through one or more dies contained within a tool pack of the bodymaker. The method comprises: obtaining output signals from one or more eddy current sensors arranged around the ram axis outside of the tool pack and adjacent to an exit end of the tool pack; processing the output signals to detect passage of open ends of can body sidewalls past the sensor(s) and thereby determine measures of the heights or thicknesses of can body sidewalls; and analysing the determined measures to identify can body sidewall defects or deterioration.

18 Claims, 4 Drawing Sheets

(51) Int. Cl.

| | |
|---|---|
| *B21D 51/26* | (2006.01) |
| *G01B 7/06* | (2006.01) |
| *G01N 27/904* | (2021.01) |
| *G08B 21/18* | (2006.01) |

(52) U.S. Cl.

CPC ............. *G01B 7/102* (2013.01); *G01B 7/107* (2013.01); *G01N 27/904* (2013.01); *G01N 27/9073* (2013.01); *G08B 21/18* (2013.01)

(58) Field of Classification Search

CPC .. G01N 27/90; G01N 27/904; G01N 27/9006; G01N 27/9013; G01N 27/9073; G08B 21/18

USPC ........................................................ 324/240

See application file for complete search history.

(56) References Cited

U.S. PATENT DOCUMENTS

| | | | | | |
|---|---|---|---|---|---|
| 5,129,252 | A | * | 7/1992 | Hahn | ..................... B21D 51/26 |
| | | | | | 72/349 |
| 5,130,653 | A | | 7/1992 | Wu et al. | |

| | | | |
|---|---|---|---|
| 10,864,568 | B2 | 12/2020 | Swedberg |
| 2018/0207706 | A1 * | 7/2018 | Swedberg ............ B21D 22/283 |
| 2019/0240717 | A1 * | 8/2019 | Rukat .................. B21D 22/286 |

FOREIGN PATENT DOCUMENTS

| | | | |
|---|---|---|---|
| EP | 3490736 | A1 | 6/2019 |
| GB | 2 021 268 | A | 11/1979 |
| GB | 2141063 | A | 12/1984 |
| GB | 2271072 | A | 4/1994 |
| GB | 2561859 | A | 10/2018 |
| JP | 5318006 | A | 12/1993 |
| JP | H06-500503 | A | 1/1994 |
| JP | 2019-525844 | A | 9/2019 |
| KR | 10-2008105 | B1 | 8/2019 |
| WO | 92/04142 | A1 | 3/1992 |
| WO | 2018/020207 | A1 | 2/2018 |

* cited by examiner

METHOD AND APPARATUS FOR DETECTING DEFECTS OR DETERIORATION IN THE SIDEWALLS OF CAN BODIES

CROSS REFERENCE TO RELATED APPLICATIONS

This application is the National Stage Entry under 35 U.S.C. § 371 of Patent Cooperation Treaty Application No. PCT/EP2021/060197, filed 20 Apr. 2021, which claims priority from United Kingdom Application No. 2006453.1, filed 1 May 2020, the contents of which are hereby incorporated by reference herein.

TECHNICAL FIELD

The present invention relates to diagnostics for can bodymakers. In particular, it relates to a method and apparatus for monitoring the can bodies being produced by a can bodymaker.

BACKGROUND

In known can bodymakers for the production of thin-walled metal two-piece can bodies by a "drawing and wall-ironing" (DWI) process, metal cups are fed to the bodymaker and carried by a punch on the end of a ram through a series of dies to produce a can body of the desired size and thickness. The series of dies may include a redraw die for reducing the diameter of the cup and lengthening its sidewall, and one or more ironing dies for wall-ironing the cup into a can body. The area or cradle of the bodymaker frame within which the dies are located is known as the "tool pack". The can body carried on the punch may ultimately contact a bottom forming tool or "domer" so as to form a shape such as a dome on the base of the can. An exemplary bodymaker is described in WO9934942.

Can bodymakers are typically operated for extended periods at high speed to produce more than around 300 to 400 can bodies per minute. However, the quality of the can bodies that are produced can vary significantly over time because of changes in, for example: the alignment of the machine components, coolant temperature and flow rate, lubrication of the machine, and/or the quality of the incoming cups (e.g. due to variations in the quality of the metal coil from which the cups are made).

During the DWI process, the metal is subject to loads as the punch forces it through the ironing dies. However, the magnitude and distribution of these loads changes both during the stroke and from stroke to stroke, leading to variations in the quality of the can bodies produced. For example, frictional forces and general wear will cause the alignment of the ram to vary slightly over time. In addition, a high speed reciprocating ram is generally subject to at least some vibration, due to the impact of the ram on the can body and to the variable "droop" of the ram as it moves from and to its fully-extended position.

As a further example, when the ram carries the can body into contact with the domer, any misalignment can lead to the can body end splitting, particularly if the can body is made from aluminium. If the misalignment is slight, the split (sometimes known as a "smile") may not be immediately visible to the naked eye, and the split may lead to the can bursting once the can body has been filled. This may not occur until the filled can has been purchased.

Poor quality can bodies may lead to wastage and down-time in can production. This may occur, for example, either because the bodymaker itself must be re-aligned or repaired (which requires skilled operators) or because other machines further down the production line are adversely affected by the poor quality cans being produced. Unfortunately, the high speed, high volume nature of the can production industry means that lost production time can be very costly for producers.

One type of can defect is a crooked, untrimmed edge of the can body, commonly referred to as a "sugar scoop" because of the can body's resemblance to the bowl-shaped end of this type of utensil. Sugar scoop defects can arise in a number of ways: (i) the cups provided to the bodymaker are themselves crooked (and the defect may be exaggerated by the DWI process); (ii) the cup is not correctly centred with respect to the punch (e.g. because the punch is not aligned to the cup locator and/or redraw sleeve); (iii) the ironing dies are misaligned with respect to the punch, leading to sidewall of the can body being thinned more on one side than the other; or (iv) the redraw die and/or ironing die(s) are damaged or worn.

In some cases, a defect in a can body may be so pronounced that the can body fails mechanically, leading to so-called "short can" or "tear off" in which a portion of the can body is left behind as debris within the can bodymaker. Typically, can production must be halted until the debris is removed to avoid damage to the bodymaker components or the production of poor quality cans. It is therefore important to be able to diagnose defects in can bodies before such catastrophic failure occurs.

One already known method of assessing can body quality involves pressing an arm of a mechanical gauge against the rim of the can body and rotating the can body about its axis to cause the arm to be displaced by varying amounts depending on the height of the rim. Although this method allows precise measurements of the can body to be made, it is far too slow to be performed for every can that is produced and requires can bodies to be removed (sampled) from the production line periodically. Problems may therefore go undiagnosed for some time, allowing significant numbers of poor quality cans to be produced and increasing the risk of a tear off occurring.

Can body diagnostic methods and apparatuses are known. For example, WO2018/020207 describes a stripper assembly for a can bodymaker that comprises a radial offset monitor for detecting radial misalignment of a ram and/or a punch of a can bodymaker, or a can body held on the punch. "Short Can Sensor" products are commercially available from Sencon (UK) LTD.

SUMMARY

According to a first aspect of the present invention, there is provided a method of detecting defects or deterioration in the sidewalls of can bodies during production of the can bodies within a can bodymaker. Each can body is formed by pushing a cup, mounted on a punch of a reciprocating ram, through one or more dies contained within a tool pack of the bodymaker. The method comprises: obtaining output signals from one or more eddy current sensors arranged around the ram axis outside of the tool pack and adjacent to an exit end of the tool pack; processing the output signals to detect passage of open ends of can body sidewalls past the sensor(s) and thereby determine measures of the heights or thicknesses of can body sidewalls; and analysing the determined measures to identify can body sidewall defects or deterioration.

The one or more sensors may comprise a plurality of sensors spaced angularly apart from one another around the ram axis. The determined measures may comprise measures of the height or thickness of the sidewall of a can body for more than one location around the circumference of the can body.

The or each eddy current sensor may be mounted within a stripper housing comprising a stripper provided with stripping fingers.

The method may comprise determining whether each of the measures is within a pre-determined range. The measure may be a measure of can sidewall height and the pre-determined range has a width of less than 10 mm, less than 5 mm, or less than 2 mm.

The method may comprise correlating the signal(s) with data indicative of the position of the ram along the ram axis. The position data may be obtained from a linear encoder or from a rotary encoder configured to be turned by a shaft used to drive the ram.

The method may comprise generating an operator alarm or notification in the event that can body sidewall defects or deterioration are identified.

According to a second aspect of the present invention, there is provided a method of operating a can bodymaker. The method comprise using the method described above for the first aspect of the present invention to detect defects or deterioration in the sidewalls of can bodies during production and, in the event of such detection, adjusting one or more operating parameters of the bodymaker or of a production line within which the bodymaker is located, to mitigate the occurrence of defects or said deterioration.

The one or more operating parameters may include a rate of production.

The operating parameter may be a parameter of a component of the production line upstream or downstream of the bodymaker, for example a cup press.

According to a third aspect of the present invention, there is provided a computer device comprising a processor configured to perform the method described above for the first and/or second aspect of the present invention.

According to a fourth aspect of the present invention, there is provided a computer program product comprising instructions, which, when executed by a computer, cause the computer to carry out the method described above for the first and/or second aspect of the present invention.

According to a fifth aspect of the present invention, there is provided an apparatus for detecting defects or deterioration in the sidewalls of can bodies during production of the can bodies within a can bodymaker. Each can body is formed by pushing a cup, mounted on a punch of a reciprocating ram, through one or more dies contained within a tool pack of the bodymaker. The apparatus comprises a housing disposed adjacent to the toolpack and within which are mounted one or more eddy current sensors. The housing and sensors are configured for attachment within the can bodymaker such that the or each sensor is arranged around the ram axis adjacent to an exit end of the tool pack. The apparatus further comprises a computer processing unit in wired or wireless communication with the or each sensor to receive therefrom the output signals of the sensor(s) and is configured to process the output signals to detect passage of open ends of can body sidewalls past the sensor(s) and to thereby determine measures of the heights or thicknesses of can body sidewalls, and to analyse the determined measures to identify can body sidewall defects or deterioration.

According to a sixth aspect of the present invention, there is provided a system comprising a can bodymaker in combination with the apparatus of the fifth aspect of the present invention. The can bodymaker comprises a punch mounted on a reciprocating ram and one or more dies contained within a tool pack, the housing and sensors are attached within the can bodymaker such that the or each sensor is arranged around the ram axis adjacent to an exit end of the tool pack.

According to a seventh aspect of the present invention, there is provided a method of operating a can bodymaker to mitigate the occurrence of defects or deterioration in the sidewalls of can bodies during production of the can bodies within the can bodymaker. Each can body is formed by pushing a cup, mounted on a punch of a reciprocating ram, through one or more dies contained within a tool pack of the bodymaker. The method comprises obtaining output signals from one or more sensors outside of the toolpack and arranged around the ram axis adjacent to an exit end of the tool pack and processing the output signals to detect passage of open ends of can body sidewalls past the sensor(s) and thereby determine measures of the heights or thicknesses of can body sidewalls. The method further comprises analysing the determined measures to identify can body sidewall defects or deterioration, and adjusting one or more operating parameters of the bodymaker, or of another component of a production line within which the bodymaker is located, to mitigate the occurrence of defects or said deterioration.

The one or more operating parameters may be selected from:

rate of can production (set speed of the can bodymaker);
operating temperature of the tool pack;
the rate or temperature at which coolant is supplied to the tool pack;
the rate at which lubricant is supplied to the tool pack; and
the domer position with respect to the ram axis.

According to an eighth aspect of the present invention, there is provided system for producing can bodies from cups. The system comprises a can bodymaker for forming a can body by pushing a cup, mounted on a punch of a reciprocating ram, through one or more dies contained within a tool pack of the bodymaker. The system also comprises a housing disposed adjacent to the tool pack and within which are mounted one or more sensors. The housing and sensors are attached within the can bodymaker such that the or each sensor is arranged around the ram axis adjacent to an exit end of the tool pack. The system further comprises a computer processing unit in wired or wireless communication with the or each sensor to receive therefrom the output signals of the sensor(s) and is configured to process the output signals to detect passage of open ends of can body sidewalls past the sensor(s) and to thereby determine measures of the heights or thicknesses of can body sidewalls. The computer processing unit is also configured to analyse the determined measures to identify can body sidewall defects or deterioration, and to adjust one or more operating parameters of the bodymaker, or of another component of a production line within which the bodymaker is located, to mitigate the occurrence of defects or said deterioration.

The one or more operating parameters may be selected from:

rate of can production (set speed of the can bodymaker);
operating temperature of the tool pack;
the rate or temperature at which coolant is supplied to the tool pack;

the rate at which lubricant is supplied to the tool pack; and the domer position with respect to the ram axis.

DETAILED DESCRIPTION

Figure 1:
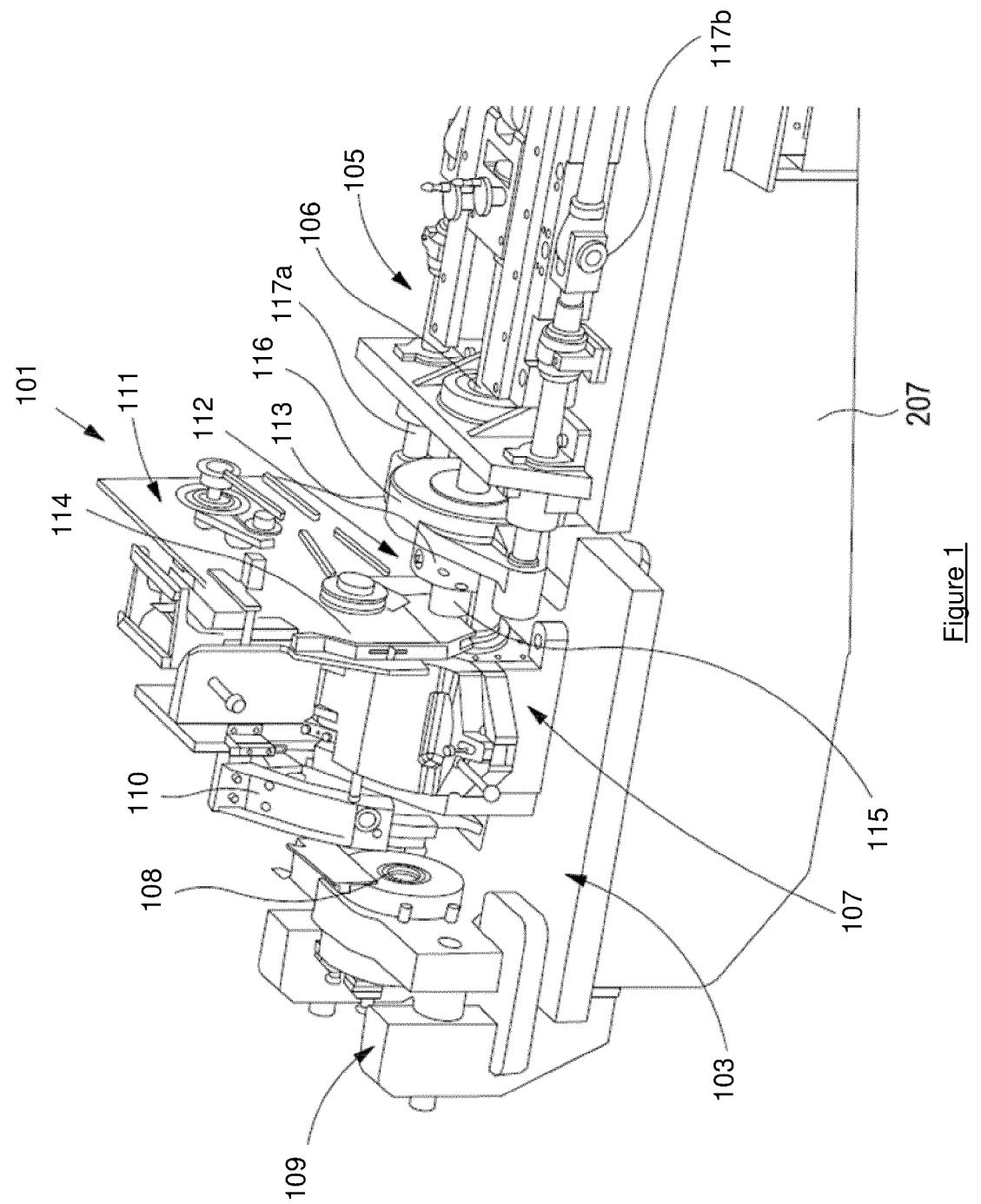
FIG. 1 is a schematic perspective view of a can body-maker.

FIG. 1 is a perspective schematic view of a modular bodymaker 101 for making can bodies from cups drawn from sheet metal. The bodymaker 101 comprises a base 102 which supports a machine bed 103 with a ram assembly 105. The ram assembly 105 comprises a reciprocating ram 106 with a punch (not shown) mounted on one end. During a forward stroke of the bodymaker 101, the punch contacts a cup (not shown) held in the path of the ram within a tool pack 107. The punch pushes the cup through a redraw die (not shown) contained within the tool pack 107 to form an elongated can body. The can body is carried on the punch to contact a bottom forming tool 108 housed by a domer module 109 so as to form a shape such as dome on the base of the can. On a return stroke of the bodymaker 101, the can body is removed from the punch by a stripper (not shown) of the tool pack 107. The can body is transported away from the ram axis by a can discharge turret 110 of an infeed-discharge module 111 located between the tool pack 107 and the domer module 109.

The tool pack 107 also comprises a redraw sleeve module 112, located in front of the redraw die (not shown) for positioning the cup during the redraw process. The redraw sleeve module 212 comprises a bearing 113 with a cup locator (not shown) to receive a cup from an infeed mechanism 114 of the infeed-discharge module 111. The bearing 113 supports a reciprocating redraw sleeve 115 that is aligned coaxially with the ram and has a central bore that allows the punch to pass therethrough. A rear end of the redraw sleeve 115 is coupled to a redraw carriage 116 that is driven in a reciprocating motion by a pair of push rods 117a, 117b located on opposite sides of the ram 106. Prior to the punch contacting the can, the redraw sleeve 115 enters the open end of the cup and forces the cup into contact with the redraw die. The redraw sleeve 115 holds the cup firmly in place against the redraw die as the punch pushes the cup through an aperture of the redraw die that is of smaller diameter than the cup. As the cup is drawn through the redraw die by the punch it reduces in diameter and its sidewall lengthens. The tool pack 107 may also contain one or more ironing dies or other tooling for forming the can body after the redraw die. The punch then carries the elongated cup away from the redraw sleeve module and through the remaining ironing dies and tooling.

Figures 2, 3, 4:
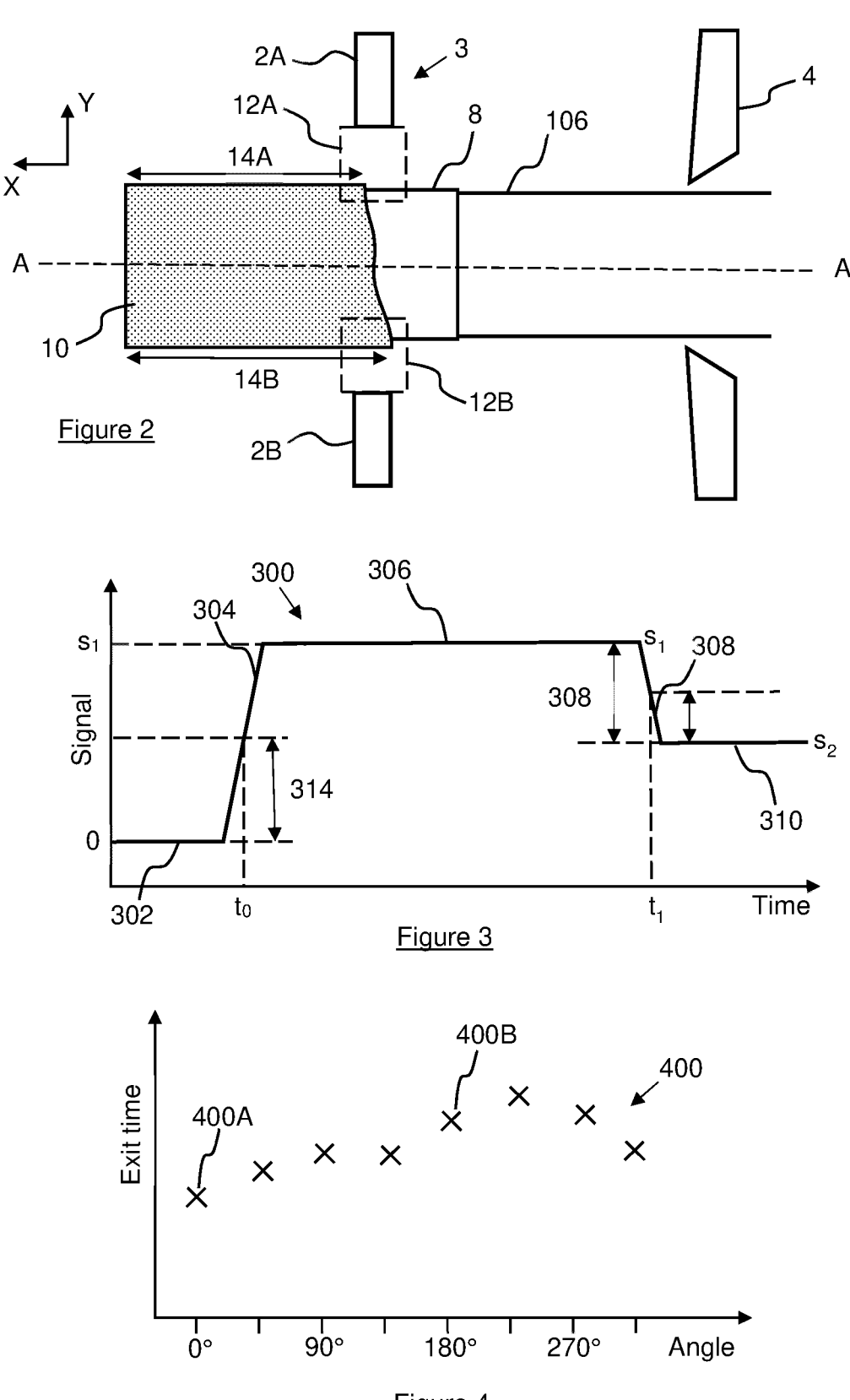
FIG. 2 is a schematic cross section view of part of the can bodymaker showing a can body moving, on the end of a ram, between two sensors.
FIG. 3 is a graph illustrating an output signal from one or the sensors of FIG. 2 as a function of time.
FIG. 4 is a graph illustrating measurements derived from output signals produced by an array of sensors.

FIG. 2 illustrates certain internal components of a portion of the can bodymaker 101 including a sensor array 3 positioned after an ironing die 4 and comprising eight sensors 2 (of which only two are visible in the FIGS. 2A, 2B) equally spaced around the circumference of a circle centred on the axis A-A' along which the ram 106 reciprocates. The figure shows the position of the punch 10 and ram 106 at an instant during the forward stroke of the ram 106 after a can body 8 mounted on the punch 8 has passed through the ironing die 4.

The sensors 2 are eddy current sensors, such as the eddyNCDT™ range manufactured by Micro-Epsilon™, which can be used to measure distances to conductive objects with an very high degree of precision, e.g. a precision of less than 1 micron. Advantageously, no contact with the object is required, such that measurement is wear-free. The eddy current sensors 2 each comprise a coil (not shown) inside an outer casing. The coil is supplied with a high-frequency alternating current in order to produce an electromagnetic field. The coil's electromagnetic field induces eddy currents in conductive materials (such as the material of can body 10) that create an opposing magnetic field that counteracts the magnetic field produced by the coil in accordance with Lenz's law. The sensors 2 are configured to produce a voltage output that depends on the strength of the opposing magnetic field, which is determined by the distance of the conductive material from the coil. The sensors 2 have an active area or "spot size" within which the conductive material needs to be located in order for a detectable output signal to be produced. For example, when the sensor is used to detect conductive material at a distance of around 3 mm, then the active area may be around 1 cm², although shielding can be used to make the area smaller if necessary. Active areas 12A,B for the two illustrated sensors 2A,2B are indicated in FIG. 2. The sensors 2 are oriented towards the axis A-A' such that the can body passes through their respective active areas as it is carried along the axis A-A' by the punch 8.

Eddy current sensors are preferred over other types of sensor, such as inductive proximity sensors, which generally have a lower time resolution, e.g. a time resolution of less than around 50 Hz (i.e. measurements per second), limited by the frequency response of the ferromagnetic core used in these sensors.

As noted above, eddy current sensors have previously been used for monitoring the radial alignment (or offset) of the punch/ram. To do this, the output signals from the sensors are typically processed to produce trajectories of the angular deflection of the punch/ram over time, either in the course of a single stroke or for multiple strokes. As the signals are dominated by the sensors detecting the punch/ram, such trajectories can provide useful diagnostic information about the radial alignment of these components with respect to the sensors. For example, radial misalignment of the ram with respect to the domer can be identified by the relatively large vibrational motion generated in the ram caused by the punch striking the domer off-centre. Surprisingly, however, the eddy current output signals can also be used to obtain useful diagnostic information about the height of the sidewall of the can body (as described below). This is possible despite the fact that the signal generated from the thin can sidewall has a smaller magnitude and shorter duration than the signals generated from the ram/punch. Eddy current sensors are particularly favourable for making these types of measurement because they can be operated at much higher frequencies (e.g. MHz frequencies) than other types of induction sensor, which allows for a temporal resolution that is high enough to resolve the movement of the can past the sensor precisely. A further benefit to using eddy current sensors is that it may not be necessary to calibrate them to account for variations in punch composition.

FIG. 3 illustrates an exemplary output signal 300 (shown on the vertical axis) obtained from one of the sensors as a function of time (shown on the horizontal axis). The signal 300 comprises (in order of increasing time): a low value (e.g. zero) initial portion 302 corresponding to times before the base of the can body has entered the active area of the sensor; a rising edge 304 caused by an increasing proportion of the active area being filled by can body; a) a plateau portion 306 for which the signal is approximately constant with a value Si and corresponding to the can body completely filling the sensor active area; b) a falling edge 308 associated with a decreasing proportion of the can body leaving the active area and the punch and b) a later plateau region 310 for which the signal is approximately constant with a value $s_2$ and corresponding to the sensor detecting only the punch.

The output signal 300 produced collectively by the sensor is processed to determine an entry time $t_0$ associated with a given angular position on the can body entering the active area and a later exit time $t_1$ associated with that angular position exiting the active area 12. In the example shown in FIG. 3, the entry time $t_0$ is determined from the rising edge 304 of the output signal 300 by identifying the value associated with the plateau portion 306 of the signal (e.g. by fitting a line through the data points of the signal 300) and then determining a time within the rising edge portion 304 at which the signal reaches half (or some other fraction) of the value $s_1$, e.g. by fitting an interpolation function (such as a polynomial or spline function) to the rising edge 304 and using a root finding algorithm (such as Newton's method) to determine the entry time $t_0$. An analogous procedure can be used to determine the exit time $t_1$ from the falling edge portion 308 of the signal 300 using the values $s_1$, $s_2$ associated with the neighbouring plateau regions 306, 310. Other methods of locating the rising and/or falling edges of the signals 300 can also be used. The entry and exit times $t_0$, $t_1$ can also be corrected using a heuristic function obtained by calibrating the entry and exit times for cans of different known heights.

The contributions to the signals 300 arising from the punch and/or ram can be removed by recording a "background" signal for which the can bodymaker is operated without a can body on the punch and then subtracting the background signal from the signals 300 obtained when the can bodymaker is operated normally. In some cases, the background signal may be an average (e.g. a mean) over more than one signal obtained without a can body on the punch.

FIG. 4 is a graph showing the exit times 400 (the vertical axis of the graph) obtained by processing the signals 300 from each of the eight sensors of the sensor array and plotted as a function of the angle (the horizontal axis of the graph) of each sensor about the axis of the ram A-A'. The variation of the exit times 400 with respect to the angle arises from the variation in the height of the sidewall of the can body (identified in FIG. 2 by reference numerals 14A,B) around its axis. For example, the exit time 400A determined from the signal 300 for sensor 2A is before the exit time 400B determined from the signal 300 from sensor 2B because the sidewall height 14A of the can body is less than the sidewall height 14B on the diametrically opposite side of the can body.

The exit times 400 for each of a series of can bodies can be compared with one another to assess the quality of the can body sidewalls of the series (either retaining angular information or looking at an average sidewall height per can body). For example, a measure of the spread of the exit times 400 can be calculated, such as the difference between the maximum and minimum of the exit times 400, or the standard deviation/variance of the exit times 400. The measure can be converted into a distance measure by multiplying it by the speed of the ram. If the measure (or distance measure) falls outside a predefined range then the produced can bodies may be identified as having a particular quality rating, e.g. a distance measure less than or equal to 50 microns may be identified as being acceptable, whilst a distance measure of more than 50 microns is deemed to indicate that the edges of the can bodies are of poor uniformity, e.g. that the can bodies suffer from a "sugar scoop" defect.

Alternatively, or additionally, the exit times 400 can be monitored to make sure that none of them falls outside of a predetermined range. For example, the exit times 400 obtained for different (e.g. successive) can bodies can be monitored for outliers or trends which may indicate wear or damage to the tooling of the bodymaker (e.g. ironing die) or a lack of uniformity in the cups fed into the can bodymaker, which may be caused by variations in the metal coil from which the cups are made.

The signals 300 and/or exit times 400 can be correlated with the longitudinal position data for the ram (and therefore, the punch) over the course of each stroke. This data may be obtained, for example, from a high-resolution rotary encoder that is turned by the shaft used to drive the reciprocating ram, or from a high-resolution linear encoder that measures the longitudinal position of the ram directly. This correlation makes it easier to identify the features in the signal data that correspond to the can body, rather than other features arising from noise or parts of the punch/ram that may be detected by the sensors. For example, the position data can be used to process the signals 300 to be functions of ram position rather time, so that only portions of the signals 300 corresponding to the end of punch being located close to or within the active areas of the sensors needs to be analysed. Additionally, the processing described above for the signals 300 as functions of time can be carried out analogously for the signals 300 as functions of ram position, which allows direct estimates of the heights of the sidewall of each can body to be estimated, without needing to estimate the velocity of the ram (which may vary from stroke-to-stroke).

Although multiple sensors around the ram axis allow variations in the height of the can body sidewalls to be determined, useful data can still be obtained using only a single sensor. For example, the data from a single sensor can be used to monitor for stroke-to-stroke trends and/or for outliers, which may be indicative of worsening alignment, wear, and/or variations in the feedstock metal.

The processing of the signals 300 obtained from the sensor array are carried out by a computer device (not shown) that uses an analogue to digital converter (ADC) to digitise the signals 300, the signals having been provided to the computer device by a wired or wireless connection. The computer device comprises a memory storing instructions for processing the signals 300 according to the method described above and a processor for carrying out the instructions. The instructions may be provided to the computer device from a computer-readable non-transient storage medium or other computer program product, such as computer program downloaded from the internet. The sensor data 300 and/or the times obtained by processing the data may be logged by the computer device, e.g. in a database, for later retrieval and analysis or to generate a "quality control" report of a particular period of can production or batch of cans. The computer device may also be used to control the can bodymaker based on the exit times 400 obtained by processing the sensor signals 300, e.g. to halt can production if the exit times 400 do not satisfy one or more criteria or to adjust one or more operating parameters (such as the set speed/repetition rate) of the can bodymaker depending on the exit times 400.

The measurements 300 obtained from the sensor array 500 during can production can be analysed using machine learning, analytics and/or artificial intelligence techniques to determine how the operation of the can bodymaker can be improved. For example, an evolutionary algorithm (or another type of optimisation algorithm) can be used to vary operating parameters of the can bodymaker according to a fitness metric based on the exit times 400 (e.g. based on what proportion of the cans are produced with sidewall heights that are within a predetermined range).

The operating parameters for the can bodymaker that are provided to the algorithm and/or controlled may include one or more of: the rate of can production (set speed of the can bodymaker), the operating temperature of the tool pack, the rate at which coolant is supplied to the tool pack, the rate at which lubricant is supplied to the tool pack, the rate at which blanks are fed into the bodymaker, and the domer position (alignment) with respect to the ram axis. The algorithm may also take as an input other types of data, such as the time elapsed since the can bodymaker was last serviced or reconfigured, the number of can produced using the current set of dies, and/or a measurement of the quality of the feedstock, such as the thickness or weight of the cups supplied to the bodymaker.

In some cases, the optimisation algorithm can be used to optimise (e.g. maximise) a particular parameter, subject to a constraint on the heights of the sidewalls of the cans as determined from the data 300 from the sensor array 500, e.g. the can production rate can be optimised subject to the sidewall heights remaining in an acceptable range (and provided the other operating parameters remain within acceptable/safe ranges too).

Feedback control can also be used to adjust one or more of the can bodymaker operating parameters in order to compensate for changes to the can bodymaker over time caused by wear or movement of the components in the can bodymaker. For example, a proportional-integral-derivative (PID) controller can be used to vary the can bodymaker operating parameters to minimise an error signal determined from the exit times 400 as a function of the operating parameters of the can bodymaker.

Feedback control can extend to other upstream and downstream components of the can production line including the bodymaker. For example, feedback can be used to control components such as an upstream cup press. Where several sources of blanks lie upstream of a bodymaker, the detection of defects may be traced back to a particular cup press and that press controlled, e.g. shut down, accordingly. Defects may also be traced back to a particular metal coil feed.

The tracing of the source of defects identified using the system described above may be aided by markings or other readable data on the blanks fed into the bodymaker. For example, laser etched markings may be read within the bodymaker, or at an output thereof, and correlated with can quality data.

Clustering or other types of classification algorithms can also be used to identify changes in the quality of the cans being produced, e.g. as a result of damage to one or more of the tool pack components (such as one of the dies) or the ram becoming misaligned.

Figure 5:
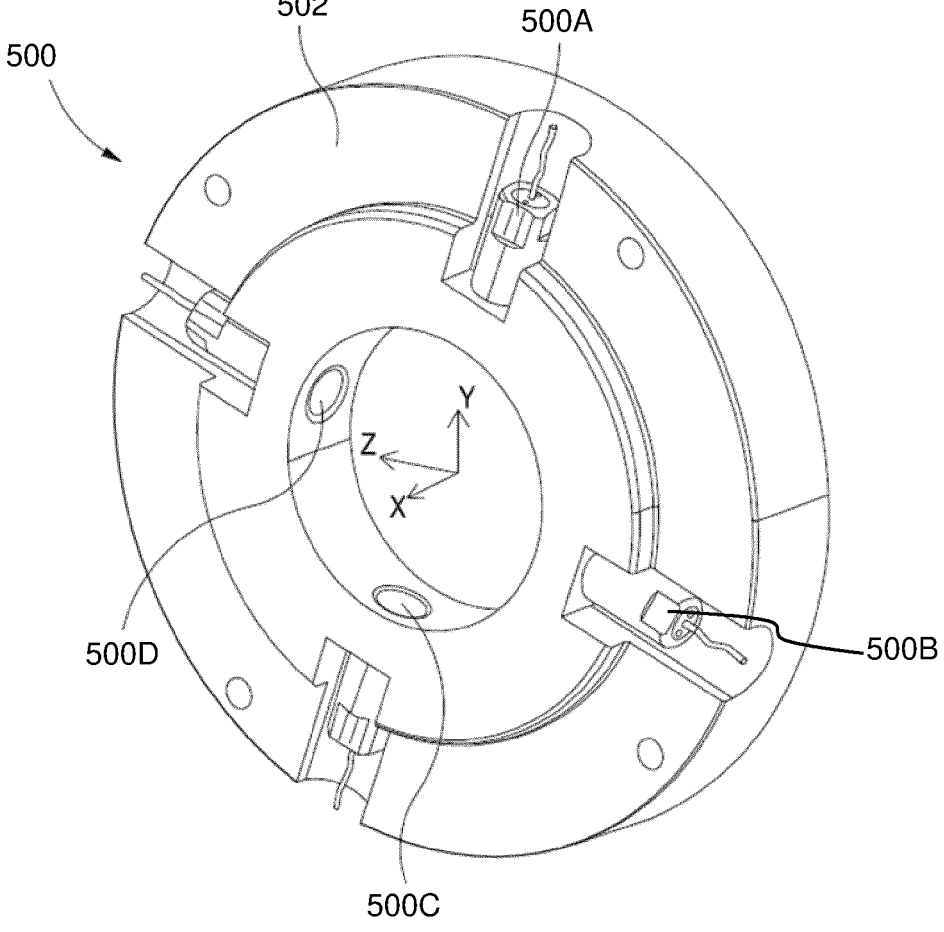
FIG. 5 is a schematic perspective view of a plurality of sensors integrated into a stripper housing.

FIG. 5 illustrates an exemplary sensor array 500 comprising a plurality of sensors 500A-D housed within the outer circumference of a stripper housing 502, which takes the form of a generally annular ring. In this example, there are four sensors 500A-D equally spaced around the stripper housing 502, although fewer, or additional sensors, may be used (as discussed above). The housing 502 comprises an internal bore configured to accommodate a can body of specific diameter, located on the punch. The stripper housing 502 is mounted to the tool pack 107 after the tool pack cradle (not shown). Positioning the sensors 500A-D in the stripper housing 502 allows the tooling (i.e. tool pack components) to remain unchanged, and affords a degree of protection for the sensors when the tooling is replaced.

Figure 6:
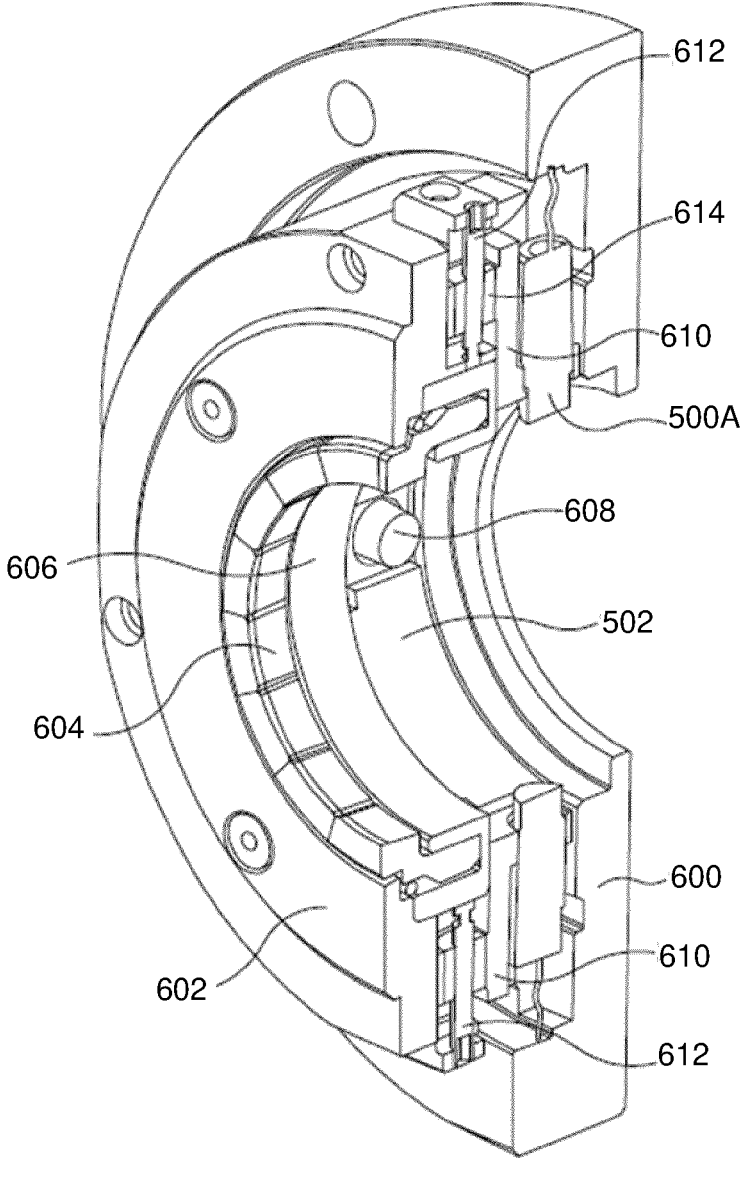
FIG. 6 is schematic cross-sectional perspective view of the stripper housing of FIG. with the stripper mounted to the housing.

FIG. 6 is a perspective cross-sectional of an adapter plate 600 that is attached to the tool pack 107 (not shown) and on which the stripper housing 502 is mounted. A steel stripper 604 is held in place on the stripper housing 502 by a retaining ring 604 and an stripper adapter ring 606. Although a steel stripper 8*b* is shown in this example, a plastic stripper, or an alternative stripper, can also be used. An air gap (is provided around each sensor face 608, such that the sensor face 608 does not come into contact with the stripper housing 502.

The stripper housing 502 is configured to accommodate four adjustment mechanisms, one adjacent to each eddy current sensor 500A-D. In this example, each adjustment mechanism comprises a miniature high precision ball screw 610 and a guide mechanism 612. The ball screw 610 converts rotary motion to linear motion. Each screw 610 comprises a moveable collar 614 attached to the guide mechanism 612, which is in turn attached to the adjacent eddy current sensor 500A-D.

Upon manual or automatic adjustment of the ball screw 610, the collar 614, guide mechanism 612 and hence the eddy current sensor 500A can be adjusted in a direction orthogonal to the inner face of the stripper housing 502. In other words, the eddy current sensor 500A can be adjusted, or screwed in or out, so that the face of the sensor 608 either protrudes from, is flush with or is recessed into the inner face of the stripper housing 502. It will be appreciated that the position of the sensor face 500A can be adjusted depending upon the diameter of the ram 106 which is to be used, or to optimise the signals 300 obtained from the sensors 500A-D so as to minimise the "background" signal arising from the punch rather than the can body.

In principle, sensors other than (or as well as) eddy current sensors could can be used to obtain suitable output signals. For example, optical sensors (e.g. photodiodes) could be used to image the can body or to measure a change in reflectivity caused by the can body passing in front of the optical sensors. Optical sensors should be cleaned regularly (e.g. by flowing cleaning fluid continuously across them) to prevent the accumulation of oil, dirt and grime. Non-optical sensors (such as eddy current sensors) are therefore preferred.

It will be appreciated by the person of skill in the art that various modifications may be made to the above-described embodiments without departing from the scope of the invention.

The invention claimed is:

1. A method of detecting defects in the sidewalls of can bodies during production of the can bodies within a can bodymaker, each can body being formed by pushing a cup, mounted on a punch of a reciprocating ram, through one or more dies contained within a tool pack of the bodymaker, the method comprising:

obtaining output signals from eddy current sensors arranged around the ram axis outside of the tool pack and adjacent to an exit end of the tool pack;

processing the output signals to detect passage of open ends of can body sidewalls past the sensor(s) and thereby determine measures of the heights of can body sidewalls; and analysing the determined measures of the heights to identify can body sidewall defects, wherein the sensors comprise a plurality of sensors spaced angularly apart from one another around the ram axis and the determined measures comprise measures of the height of the sidewall of a can body for more than one location around the circumference of the can body, thereby a detecting sugar scoop defect.

2. A method according to claim 1, wherein the or each eddy current sensor is mounted within a stripper housing comprising a stripper provided with stripping fingers.

3. A method according to claim 1 and comprising determining whether each of the measures is within a pre-determined range.

4. A method according to claim 3, wherein the measure is a measure of can sidewall height and the pre-determined range has a width of less than 10 mm, less than 5 mm, or less than 2 mm.

5. A method according to claim 1 and comprising correlating the signal(s) with data indicative of the position of the ram along the ram axis.

6. A method according to claim 5, wherein the position data is obtained from a linear encoder or from a rotary encoder configured to be turned by a shaft used to drive the ram.

7. A method according to claim 1 and comprising generating an operator alarm or notification in the event that can body sidewall defects are identified.

8. A method of operating a can bodymaker and comprising using the method of claim 1 to detect defects in the sidewalls of can bodies during production and, in the event of such detection, adjusting one or more operating parameters of the bodymaker or of a production line within which the bodymaker is located, to mitigate the occurrence of defects.

9. A method according to claim 8, wherein the one or more operating parameters include a rate of production.

10. A method according to claim 8, where the operating parameter is a parameter of a component of the production line upstream or downstream of the bodymaker, for example a cup press.

11. A computer device comprising a processor configured to perform the method of claim 1.

12. A computer program product comprising instructions which, when executed by a computer, cause the computer to carry out the method of claim 1.

13. Apparatus for detecting defects in the sidewalls of can bodies during production of the can bodies within a can bodymaker, each can body being formed by pushing a cup, mounted on a punch of a reciprocating ram, through one or more dies contained within a tool pack of the bodymaker, the apparatus comprising:

a housing disposed adjacent to the toolpack and within which are mounted eddy current sensors, the housing and sensors being configured for attachment within the can bodymaker such that the or each sensor is arranged around the ram axis adjacent to an exit end of the tool pack; and a computer processing unit in wired or wireless communication with the or each sensor to receive therefrom the output signals of the sensor(s) and being configured to process the output signals to detect passage of open ends of can body sidewalls past the sensor(s) and to thereby determine measures of the heights of can body sidewalls, and to analyse the determined measures to identify can body sidewall defects, wherein the sensors comprise a plurality of sensors spaced angularly apart from one another around the ram axis and the determined measures comprise measures of the height of the sidewall of a can body for more than one location around the circumference of the can body, thereby a detecting sugar scoop defect.

14. A system comprising a can bodymaker in combination with the apparatus of claim 13, the can bodymaker comprising a punch mounted on a reciprocating ram and one or more dies contained within a tool pack, the housing and sensors being attached within the can bodymaker such that the or each sensor is arranged around the ram axis adjacent to an exit end of the tool pack.

15. A method of operating a can bodymaker to mitigate the occurrence of defects in the sidewalls of can bodies during production of the can bodies within the can bodymaker, each can body being formed by pushing a cup, mounted on a punch of a reciprocating ram, through one or more dies contained within a tool pack of the bodymaker, the method comprising:

obtaining output signals from sensors outside of the toolpack and arranged around the ram axis adjacent to an exit end of the tool pack;

processing the output signals to detect passage of open ends of can body sidewalls past the sensor(s) and thereby determine measures of the heights of can body sidewalls;

analysing the determined measures to identify can body sidewall defects; and adjusting one or more operating parameters of the bodymaker, or of another component of a production line within which the bodymaker is located, to mitigate the occurrence of defects, wherein the sensors comprise a plurality of sensors spaced angularly apart from one another around the ram axis and the determined measures comprise measures of the height of the sidewall of a can body for more than one location around the circumference of the can body, thereby a detecting sugar scoop defect.

16. A method according to claim 15, wherein the one or more operating parameters are selected from:

rate of can production;

operating temperature of the tool pack;

the rate or temperature at which coolant is supplied to the tool pack;

the rate at which lubricant is supplied to the tool pack; and the domer position with respect to the ram axis.

17. A system for producing can bodies from cups, the system comprising:

a can bodymaker for forming a can body by pushing a cup, mounted on a punch of a reciprocating ram, through one or more dies contained within a tool pack of the bodymaker;

a housing disposed adjacent to the tool pack and within which are mounted sensors, the housing and sensors being attached within the can bodymaker such that the or each sensor is arranged around the ram axis adjacent to an exit end of the tool pack; and a computer processing unit in wired or wireless communication with the or each sensor to receive therefrom the output signals of the sensor(s) and being configured to process the output signals to detect passage of open ends of can body sidewalls past the sensor(s) and to thereby determine measures of the heights of can body sidewalls, to analyse the determined measures to identify can body sidewall defects, and to adjust one or more operating parameters of the bodymaker, or of another component of a production line within which the bodymaker is located, to mitigate the occurrence of defects, wherein the sensors comprise a plurality of sensors spaced angularly apart from one another around the ram axis and the determined measures comprise measures of the height of the sidewall of a can body for more than one location around the circumference of the can body, thereby a detecting sugar scoop defect.

18. A system according to claim 17, wherein the one or more operating parameters are selected from:

rate of can production;

operating temperature of the tool pack;

the rate or temperature at which coolant is supplied to the tool pack;

the rate at which lubricant is supplied to the tool pack; and the domer position with respect to the ram axis.

\* \* \* \* \*